(12) United States Patent
Rumer

(10) Patent No.: US 6,486,462 B1
(45) Date of Patent: Nov. 26, 2002

(54) TUNABLE OPTICAL ADD-DROP MULTIPLEXER

(75) Inventor: Mark Rumer, Santa Barbara, CA (US)

(73) Assignee: Occam Networks, Santa Barbara, CA (US)

( * ) Notice: Subject to any disclaimer, the term of this patent is extended or adjusted under 35 U.S.C. 154(b) by 0 days.

(21) Appl. No.: 09/853,417

(22) Filed: May 10, 2001

(51) Int. Cl.$^7$ .................................................. H01J 3/14
(52) U.S. Cl. .............. 250/216; 250/227.23; 250/237 G; 359/115
(58) Field of Search ............................ 250/216, 227.23, 250/237 G, 227.11, 227.18, 227.21, 214 LA; 359/115–125, 130, 138, 149, 151, 244, 245, 831–837

(56) References Cited

U.S. PATENT DOCUMENTS 6,249,365 B1 * 6/2001 Mizrahi et al. ............. 359/130

* cited by examiner

Primary Examiner—Que T. Le
(74) Attorney, Agent, or Firm—Blakely Sokoloff Taylor & Zafman LLP

(57) ABSTRACT

An optical add/drop multiplexer to be tuned locally or remotely, to compensate for drift in operation, and to facilitate installation or replacement at remote terminals.

16 Claims, 6 Drawing Sheets

TUNABLE OPTICAL ADD-DROP MULTIPLEXER

BACKGROUND

1. Field of the Invention

The invention generally relates to optically-based products and more particularly to communications over optical transmission networks.

2. Description of Related Art

Synchronous Optical Networks (SONET) have been used for inter alia, commercial telephone and data distribution services. Most of the implementations of optical data transmission for commercial use are SONET based architectures. These networks consist of an optical ring emanating from a central office (CO) terminating either at end offices or remote terminal (RT) boxes.

SONET solves the need to deploy voice and some business data service to an existing group of subscribers. However, the bandwidth for SONET was architected for traditional 64 kb/s voice services and is based on Time Domain Multiplexing (TDM). Most of the implementations were installed in the early to mid 1990s and were designed to support on the order of 10,000 subscribers per optical carrier 3 (OC3) optical ring. With business subscribers utilizing for example, T1 connections, the number of subscriber service lines is further limited.

In the context of residential broadband service, Asymmetric Digital Subscriber Line (ADSL) or other sorts of broadband access technologies operate at a bandwidth typically on the order of 100 times that of voice. Thus even though SONET rings appear to have a significant bandwidth, there is a considerable amount of oversubscription that occurs from a data perspective when trying to provide broadband telephony on a commercial scale. Gigabit Ethernet technology is a native packet transport scheme which is more efficient than a traditional TDM structure. As such it is better suited to operate in a data domain than is a TDM SONET.

Most of the existing SONET rings are built on 1310 nanometer (nm) optics. A typical OC3 ring includes a 1310 nm. laser, a photodetector that is optimized for the 1310 nm. band of light, a single mode fiber and optical splicing components. Basically, in such systems, light is transmitted from a Central Office (CO) to remote terminal #1, to remote terminal #2, to remote terminal #3, and so on, with add/drop multiplexers at each interim node.

To add another wavelength of light over the same channel (e.g., to combine a 1550 nm signal with a 1310 nm. signal in a channel), one must typically employ wave division multiplexing (WDM) hardware. The WDM hardware typically includes a Fiber Bragg Grating (FBG) or other nonlinear crystal and associated optical fibers. An erbium doped optical fiber ring can transmit both the 1310 nm. and the 1550 nm. wavelengths of light. A standard Erbium Doped Fiber Amplifier (EDFA) typically may have a bandwidth wide enough to handle either band, or anywhere in-between for that matter.

Transmission problems are seen where it is desired to use more than the 1310 nm and 1550 nm specific wavelengths. Examples include four channel add/drop multiplexers, or taking a 1310 nm., and adding four channels of 15xx wavelength hardware on top of it. For example, a four channel 1550 nm wave division multiplexor (WDM) wavelength, typically operates at 1510, 1520, 1530, and 1540 nm. Four channel 1550 operations usually have windows at each of those stages. The limitations is that if one is only adding or dropping one channel at a particular node one must have a laser that is tuned to that particular frequency, and a photodetector that looks at that particular frequency. Which means that each node has to be preset to that particular frequency. This means that the telephony installation technician has to have optics components for each wavelength at his disposal to service each different terminal. Each wavelength in which the telephony system is capable of transmitting data must have add/drop multiplexers that are tuned to that wavelength and labeled accordingly. This results in much overhead distributed among the stock room, the CO, and the other service technicians who are required to have all hardware variations with them. Additionally, the technicians must know which multiplexers to use when they try to replace terminal hardware. In other words they have to make sure the replacement for the particular multiplexer he is replacing matches the wavelength for the bad module so he does not plug in a module tuned to the wrong frequency and thus interfere with a signal of a different wavelength of some other remote terminal in the ring.

FIG. 1 is a representation of an optical ring. Central Office (CO) 100 is connected to the remote terminal equipment by fiber optic loop 500. Incumbent equipment includes a SONET OC3 ring. Due to large deployment rates in broadband, there is not enough bandwidth in the traditional SONET OC3 optical ring. Data congestion could be alleviated by a virtual point to point connection to each remote terminal without having individual fibers connect each of these sites. If this were a traditional OC3 bandwidth ring, all the bandwidth of the OC3 ring is shared over the entire ring. A parallel path could be built using the exiting fiber in the ring by using WDM. Add/drop multiplexers may be used to use put each of these Remote Terminals (RT) at different wavelengths. Assume existing SONET uses 1310 nm. Assigning RT #1 to wavelength 1510 nm., RT #2 at 1530 nm., and RT #3 at 1550 nm. These wavelengths of light are overlaid on an existing SONET ring, but use different wavelengths of light. Using traditional techniques each site would have a fixed-wavelength add/drop multiplexer and laser tuned at that particular wavelength. This would require three specific models of gear as well as deployment of all this gear at the various sites. This invention is one add/drop multiplexing module that is capable of operating at all of the wavelengths transmitted over an optical fiber and yet tunable to any specific wavelength desired at the time of deployment or replacement.

A lot of progress has been made on tunable laser technology. For example inter alia, how to tune a laser to get exactly the frequency desired. Add/drop technology in the transmit, direction is unnecessary, all that is needed is an optical combiner.

Photodiodes are generally not tunable to a particular frequency, nor do they have enough quality or selectivity to be able to isolate its own tunable band. A photo diode that is tuned to the 1300 band is likely going to respond to a signal in the 1500 band as well. A filter in front of the device is required.

Wavelength Add/drop modules are such that they will only split off a particular wavelength of light while passing remaining wavelengths. Typically the majority of the selected wavelengths energy will be split off and 99% of the other frequencies of light will pass through, making them advantageous where multiple nodes must share a single fiber run.

The difficulty with optical filters is how to make an optical filter that can be set to one of a variety of wavelengths in the field. Something that is scaleable to deployment in the field. Small enough to fit in an optical interface, and cheap enough to deploy on a mass basis. That is where that tunable wavelength filter is beneficial.

An improved add/drop multiplexer that is affordable and small enough to be deployed commercially is needed.

SUMMARY

In one embodiment, a scheme for tuning an optical add/drop multiplexer may be used to maintain focus on the wavelength of interest, and avoid drift in signal capture due to misuse or environmental conditions and pass undesired wavelengths through to other nodes. In one example, an apparatus configured for use in the present scheme includes one add/drop multiplexing module that is tunable to the frequencies desired at the time of deployment or replacement. In this manner an existing SONET ring may employ course wave division multiplexing (two channel, potentially four channel, optical add/drop multiplexing) to add Gigabit Ethernet services on top of traditional SONET services (e.g., voice). Such a scheme may allow for an increase in useful bandwidth of approximately 10 times the bandwidth of traditional OC3.

Additional features, embodiments, and benefits of this scheme will be evident in view of the figures and detailed description presented herein.

BRIEF DESCRIPTION

The present invention is illustrated by way of example, and not limitation, in the figures of the accompanying drawings, in which.

DETAILED DESCRIPTION OF THE INVENTION

A tunable add/drop multiplexer is disclosed herein. According to one embodiment, a tunable optical filter component is configured to act as an add/drop multiplexer on an optical fiber communications loop.

In the following description, for the purposes of explanation, numerous specific details are set forth in order to provide a thorough understanding of the invention. It will be apparent, however, to one of ordinary skill in the art that the present invention may be practiced without some of these specific details. The following description and accompanying drawings provide various examples for the purposes of illustration. However, these examples should not be construed in a limiting sense as they are merely intended to provide examples of the invention rather than to provide an exhaustive list of all possible implementations of the invention.

Reference will now be made to drawings wherein like structures will be provided with like reference designations. In order to show the structures of the invention most clearly, the drawings included herein are diagrammatic representations of integrated circuit structures. Thus, the actual appearance of the fabricated structures, for example in a photomicrograph, may appear different while still incorporating the essential structures of the invention. Moreover the drawings show only the structures necessary to understand the invention. Additional structures known in the art have not been included to maintain the clarity of the drawings.

Figure 1:
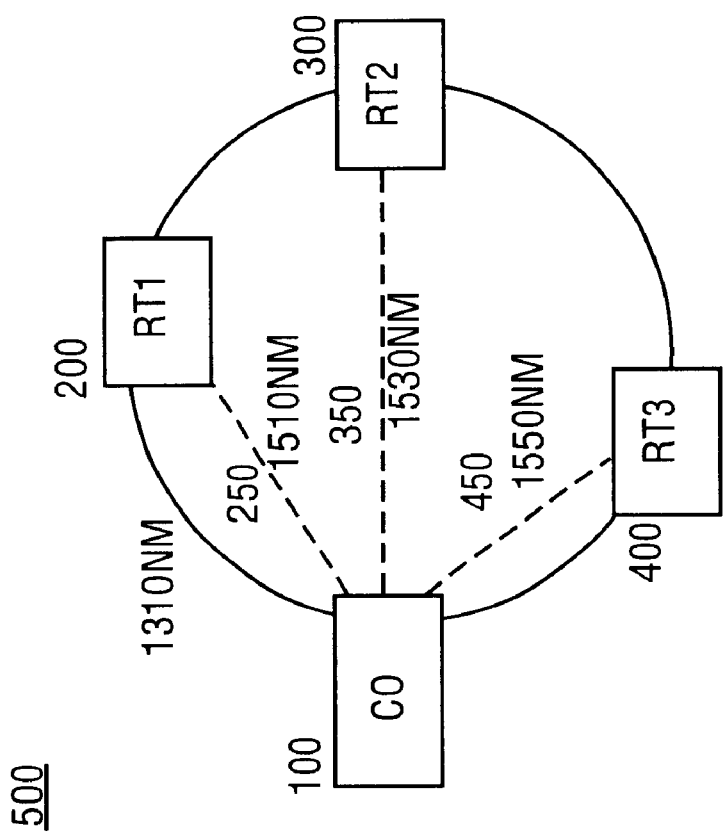
FIG. 1 is a schematic illustration of an embodiment of an optical ring network.

FIG. 1 illustrates an optical ring communication system. In one embodiment, Central Office (CO) 100 is connected to any number of remote terminals (RT) 200, 300 and 400 through an Erbium Doped Fiber Amplifier (EDFA) 500. A virtual point to point optical connection can be made from the Central Office to each Remote Terminal 250, 350 and 450 respectively along the existing EDFA. In this embodiment, the Central Office uses 1510 nm. light to communicate with Remote Terminal #1, 1530 nm. light to communicate with Remote Terminal #2 and 1550 nm. light to communicate with Remote Terminal #3.

Figure 2:
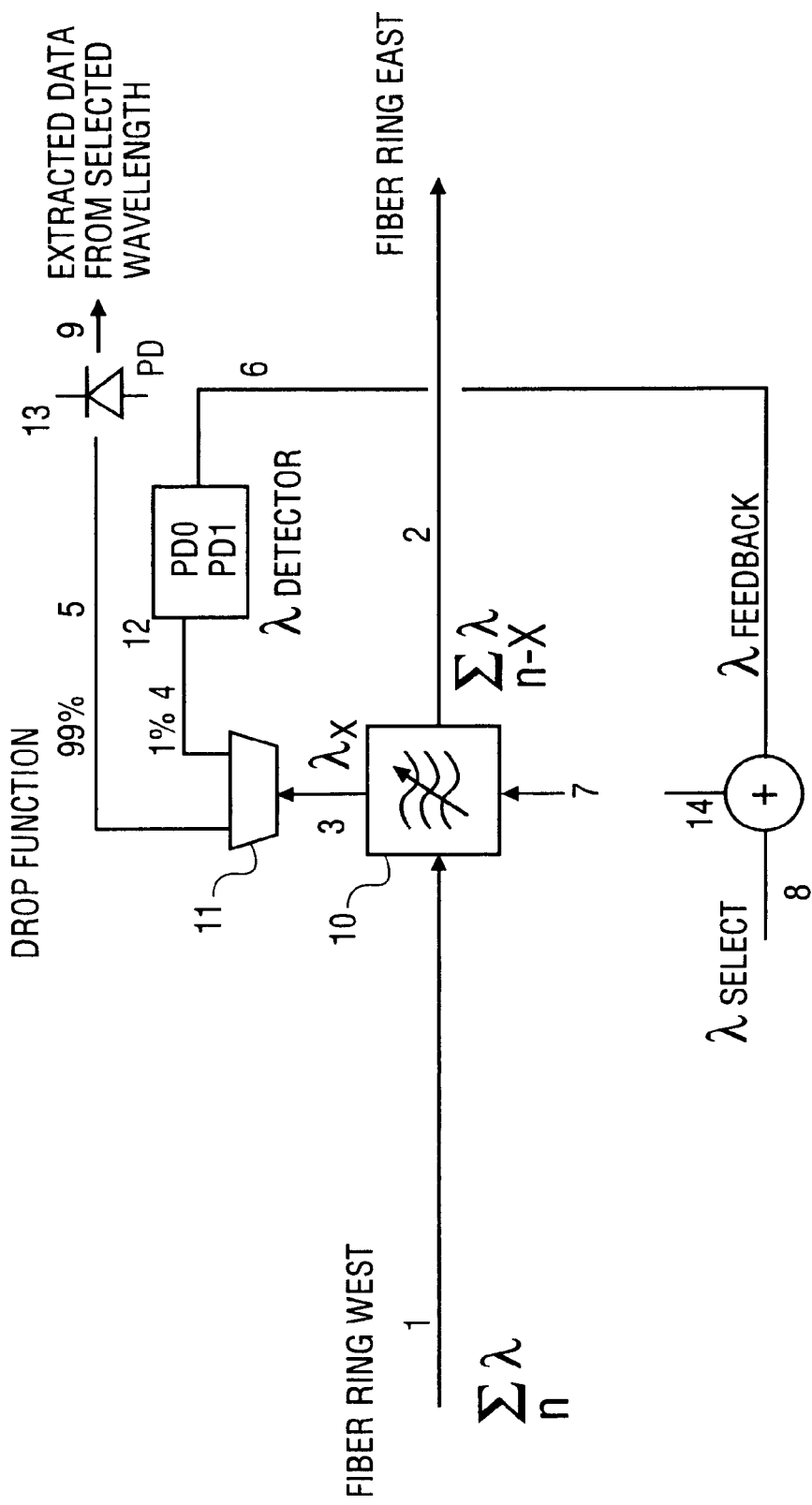
FIG. 2 is a schematic illustration of one embodiment of a drop function configured in accordance with the present invention.

FIG. 2 is a schematic illustration of one embodiment of the drop function incorporated in the present add/drop multiplexer. Fiber Ring West 1 carrying all relevant colors of light is received into a tunable wavelength filter 10 where the frequency of interest $\lambda_x$ is extracted through drop path 3. Fiber Ring East 2 then provides all colors of light, except the frequency of interest that was dropped at the filter 10, to the next element in the ring. The component of the transmitted light at the frequency of interest travels along the drop path 3 to a beam splitter 11 that separates the majority of the signal, ~99%, from a minority of the signal ~1%. Following this separation, the majority component of the signal travels along an optical fiber to a photodiode 13 that converts the light signal into an electrical signal that represents the extracted data from the original carrier signal (i.e., the data that was modulated at the selected wavelength of interest). The minority component of the data signal 4 that was split off enters a wavelength detector 12 and is used in an optical feedback loop where it is combined with the wavelength selected from optical path 8 in an optical mixer 14 to obtain a control wavelength to control the selection window of the filter 10.

Figure 3:
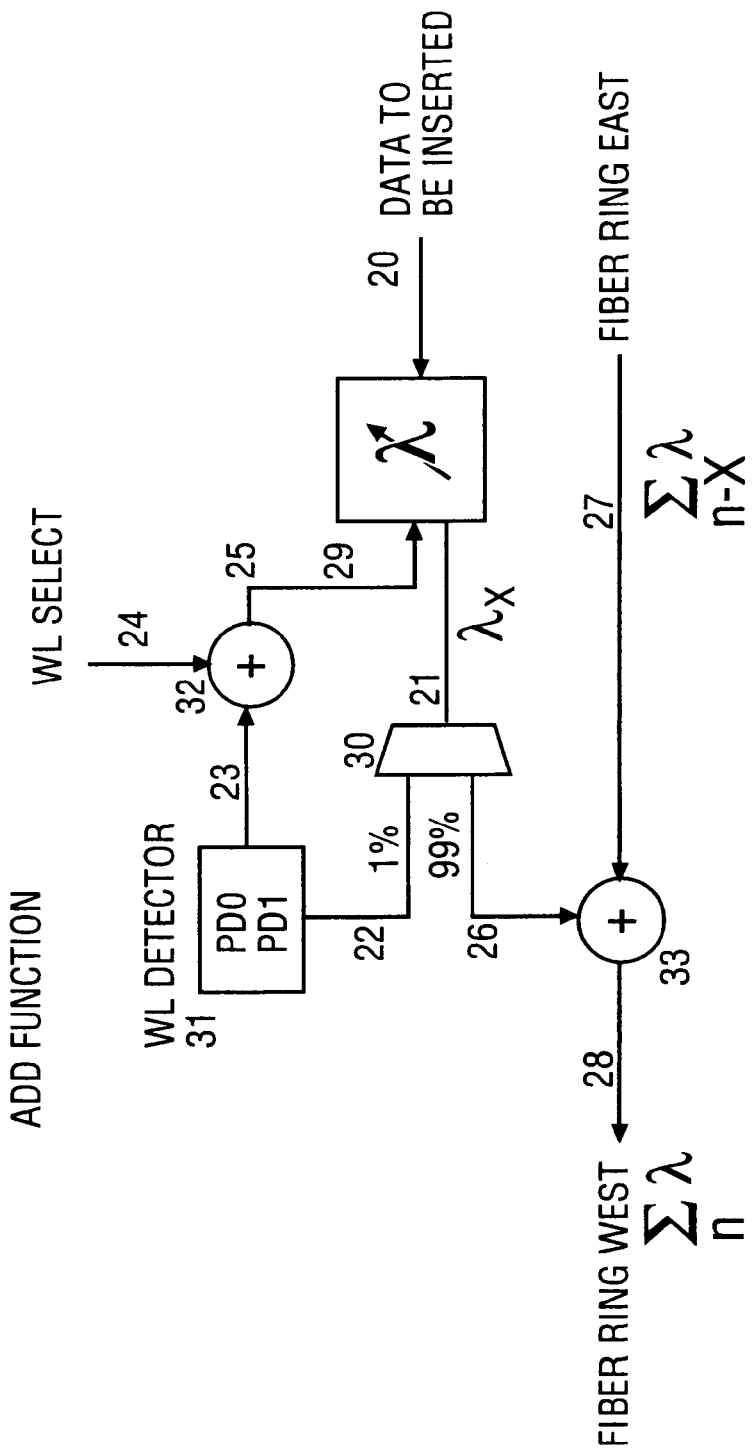
FIG. 3 is a schematic illustration of one embodiment of an add function configured in accordance with the present invention.

FIG. 3 is a schematic illustration of one embodiment of an add function for the present multiplexer. The data to be inserted in fiber ring west 28 is represented by an electrical signal that is provided to tunable laser 29 along electrical path 20. The tunable laser transforms the electrical signal into a light signal at a wavelength of interest $\lambda_x$. The light signal travels along optical path 21 to a beam splitter 30 that provides the majority component of the light signal, ~99%, along optical path 26 to optical mixer 33. Optical mixer 33 combines this majority component of the light signal at the wavelength of interest with the other light signals of different wavelengths traveling along fiber ring east 27 into fiber ring west 28.

A minority component of the light signal at the wavelength of interest $\lambda_x$ leaves beam splitter 30 along optical path 22 bound for wavelength detector 31. The output of wavelength detector 31 is summed with the light signal selected from optical path 24 in optical mixer 32 to create a feedback control loop for tunable laser 29.

Figure 4:
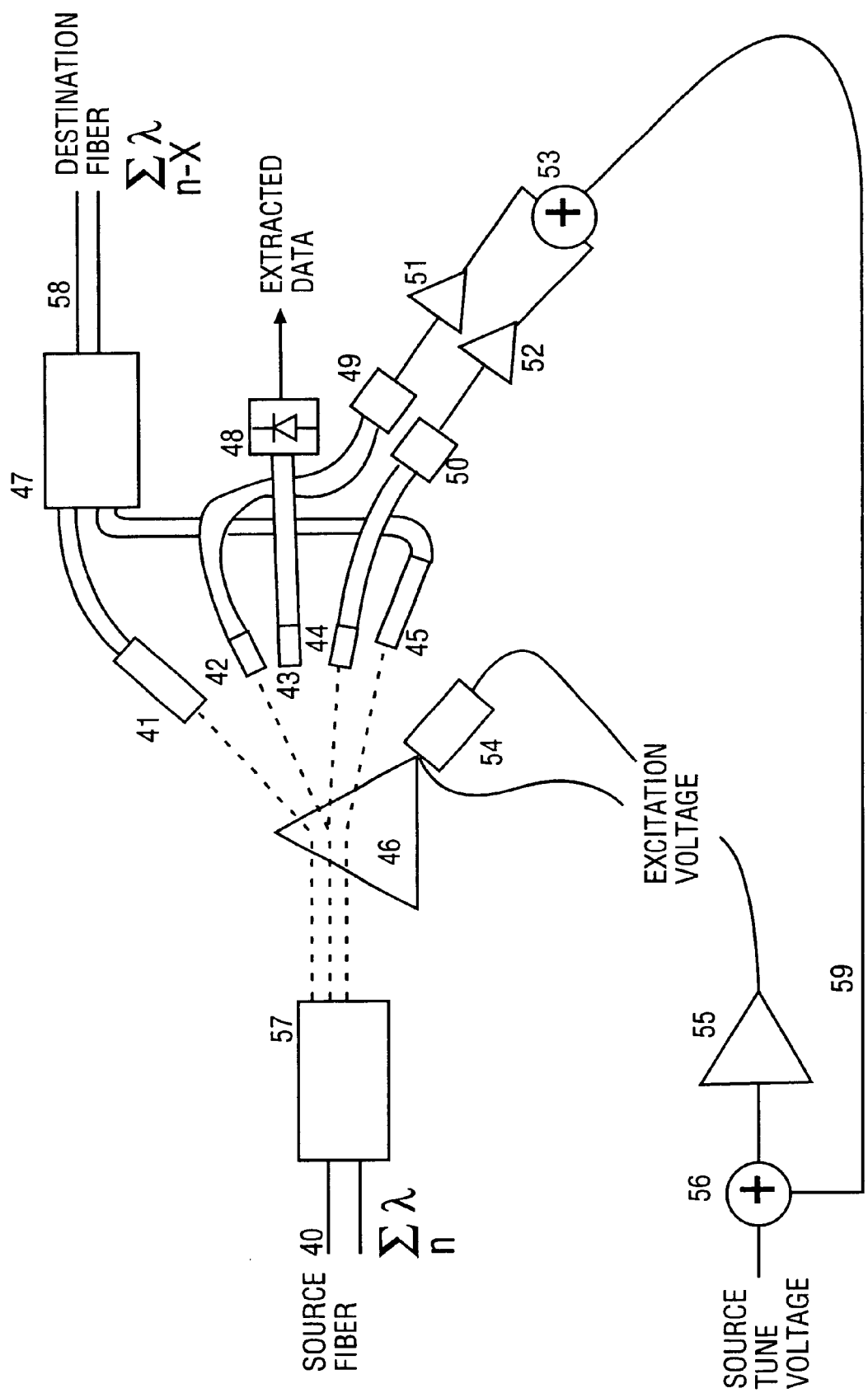
FIG. 4 is a schematic illustration of one embodiment of a drop side wavelength selector and locker/detector configured in accordance with the present invention.

FIG. 4 illustrates an embodiment of a drop side wavelength selector and locker/detector configured in accordance with one embodiment. A light signal made up of a group of light signals of various wavelengths traveling along source fiber 40 enters collimator 57 and impinges on positionable prismatic element 46. In one embodiment, the prismatic element is a Bragg grating.

The prismatic element has a fixed point and a piezoelectric actuator 54 that allows the prismatic element to move relative to the fixed positions of collimators 41, 42, 43, 44 and 45. A group of light signals of various wavelengths exiting collimator 57 and striking prismatic element 46 will undergo diffraction based on the course frequency of the light. The light leaving prismatic element 46 will spread out in a plane according to wavelength.

Motion of the prismatic element relative to the fixed positions of the collimators 41, 42, 43, 44 and 45 allows steering of the refracted light leaving the prismatic element. Steering the refracted light from prismatic element 46 allows the wavelength of interest $\lambda_x$ to strike collimator 43. Collimator 43 is the collimator for the drop line for the wavelength of interest. Collimators 42 and 44 pick up the side lobes of the wavelength of interest that do not strike collimator 43, and are used by the electrical feedback loop to steer the prismatic element. The wavelength of interest $\lambda_x$. strikes collimator 43 and is transformed into an electrical signal by photodiode #1 48. The electrical signal is the data signal extracted by the drop function from source fiber 40.

FIG. 4 also shows the feedback circuit used to steer the refracted light of prismatic element 46. The side lobes of the light signal at the wavelength of interest striking collimator 43 also strike collimators 42 and 44. Light striking collimators 42 and 44 is converted into electrical signals by photodetectors 49 and 50, respectively, and these electrical signals are amplified by differential amplifiers 51 and 52 and combined in mixer 53. The output of mixer 53 is the automatic frequency control voltage which is summed with the source tuning voltage in mixer 56, amplified by amplifier 55 and used as the excitation voltage to adjust the piezoelectric actuator 54 that moves the prismatic element 46.

FIG. 4 further shows what happens to the remaining components of a light signal that are not at the wavelength of interest in source fiber 40. On either side of the three inside collimators 42, 43 and 44 are collimators 41 and 45. Collimators 41 and 45 collect any light that is not at the wavelength of interest and combines this light in combiner 47 before transmitting the light out through the destination fiber 58. So then destination fiber 58 carries all wavelengths of light that left source fiber 40 except the wavelength of interest $\lambda_x$.

One embodiment of the system illustrated in FIG. 4 could be a four-band wave division multiplexer based on the 1550 nm. light band. In that embodiment, collimator 41 would have a 40 nm. window, say from 1510 nm. to 1550 nm. Collimator 45 would have a 40 nm. window from 1520 nm. to 1560 nm. Collimator 43 would have a 10 nm. window, for example 1525 nm. to 1535 nm. In this embodiment the wavelength of interest, $\lambda_x$ would be 1530 nm. In another embodiment, one might apply all the colors of a light signal but one through collimator 41 and only one color through collimator 43. In another embodiment, one might apply all of the colors of a light signal but one through collimator 45, and only one color through collimator 43. In still another embodiment, one might apply some colors of a light signal through collimator 41, other colors of the light signal through collimator 45 and one color of the light signal through collimator 43.

Figure 5:
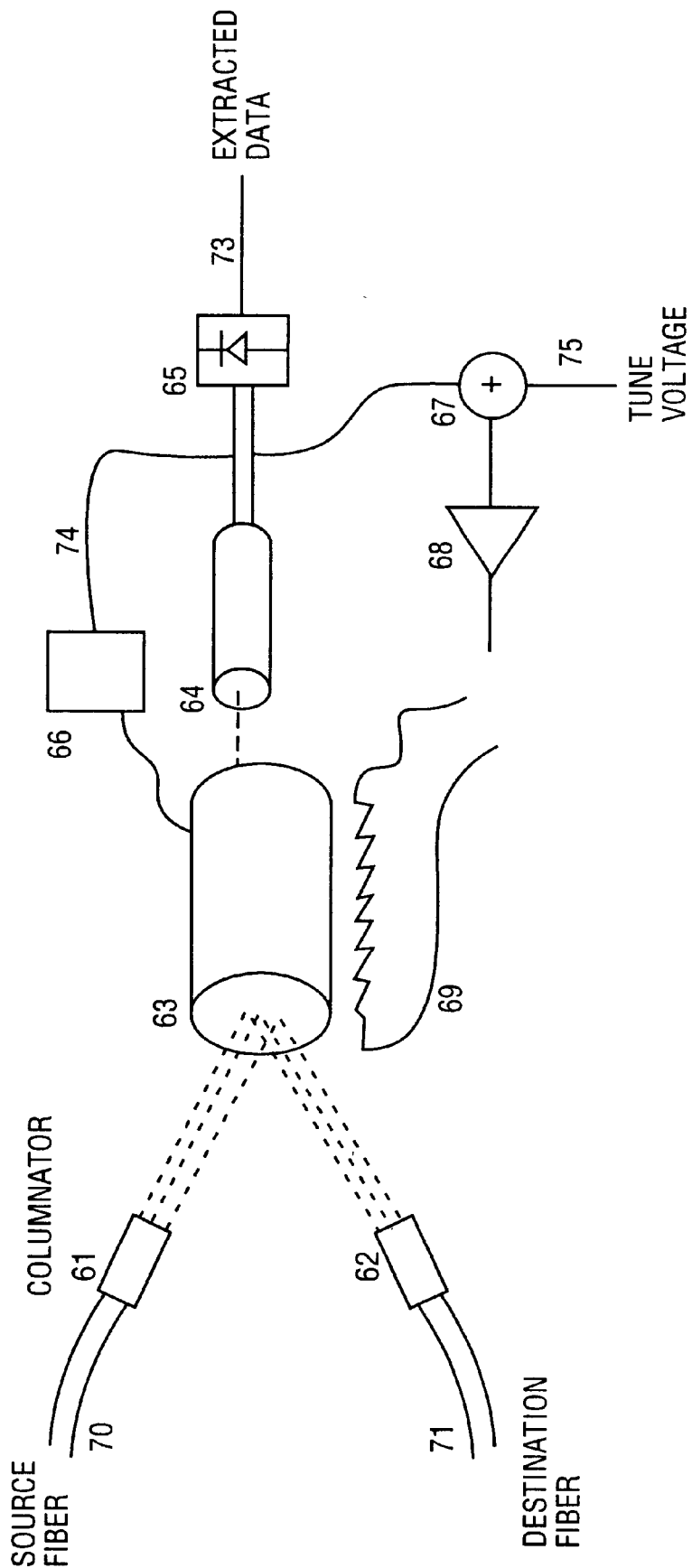
FIG. 5 is a schematic illustration of one embodiment of a drop side wavelength selector and locker/detector configured in accordance with the present invention.

FIG. 5 is an illustration of an embodiment of a multiplexer, which uses a diffraction wavelength filter to enable a drop function. Source fiber 70 carries all the colors of the light signal in the fiber ring, and emits them through collimator 61. Destination fiber 71 carries all of the colors of the light signal in the fiber ring except the wavelength of interest $\lambda_x$, having received them through collimator 62.

All light from collimator 61 impinges on temperature dependent diffraction filter 63. Diffractor 63 reflects the entire light incident thereon, except the wavelength of interest $\lambda_x$. Diffractor 63 is of such size that by heating and cooling it can be tuned to transmit any of the potential wavelengths of interest transmitted over source fiber 70. A heating element 69 is positioned to maintain diffraction filter 63 at the appropriate temperature to pass the wavelength of interest $\lambda_x$. Then, light at the wavelength of interest $\lambda_x$, is collected by collimator 64 and transmitted to photodiode 65, which turns the light into an electrical signal that represents the extracted data.

A temperature sensor 66 observes the temperature of diffraction filter 63. The signal from temperature sensor 66 is mixed with a tuning voltage in mixer 67 and amplified to act as a feedback control loop to maintain the diffraction filter 63 at an appropriate temperature for transmitting the wavelength of interest $\lambda_x$.

Figure 6:
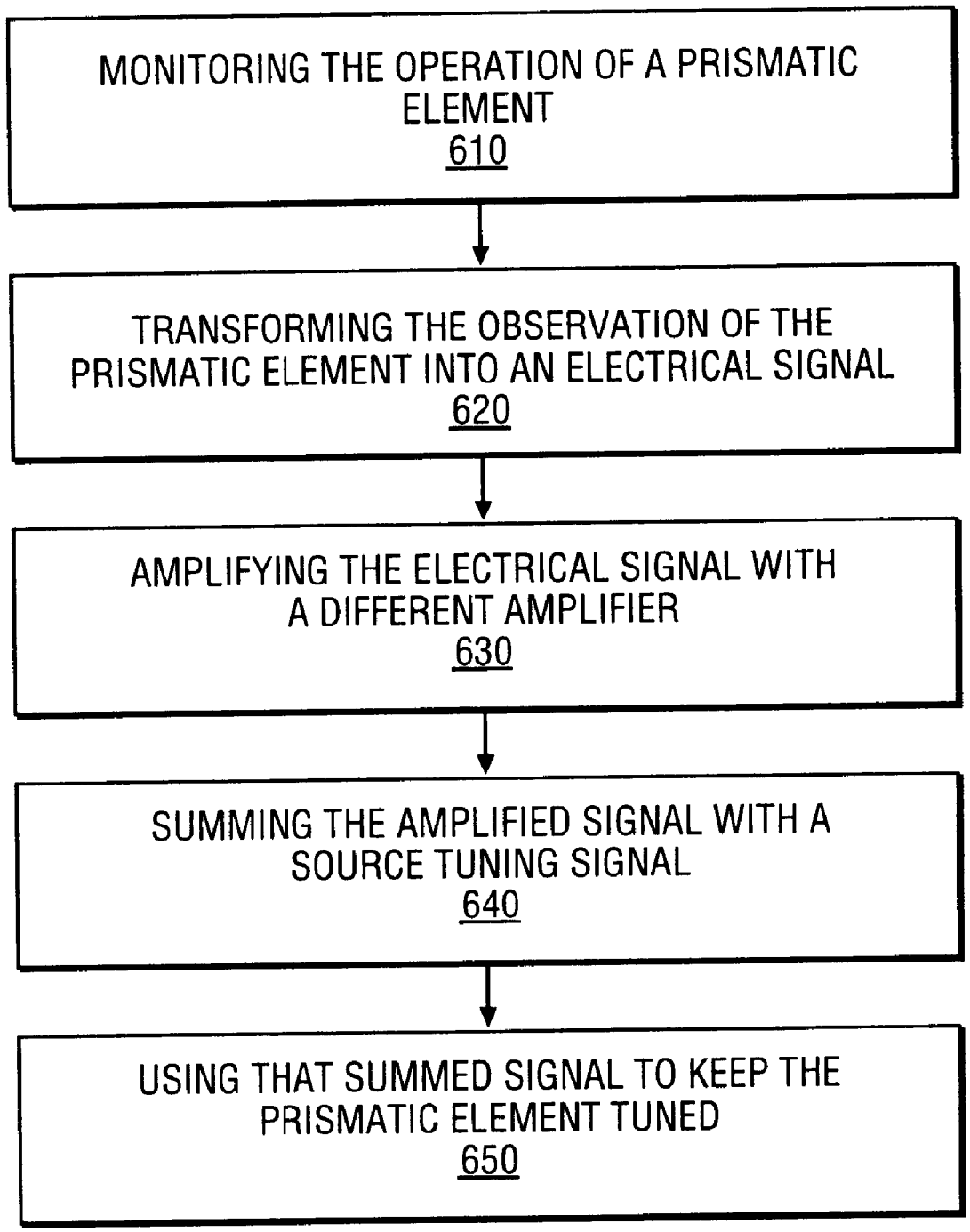
FIG. 6 is a flow diagram representation of one method of the present invention.

FIG. 6 is a flow diagram representing one method of the present invention. At step 610, the operation of the prismatic element is monitored. The observation of the prismatic element is converted into an electrical signal in part 620, by for example, the side-lobe radiation in collimators 42 and 44 in FIG. 4 that is converted to an electrical signal, or the temperature of the diffraction wavelength filter 63 in FIG. 5 measured by temperature sensor 66. The electrical signal is amplified in a differential amplifier in part 630. The amplified signal is summed with a source signal in part 640. The summed signal is used to keep the prismatic element tuned to a particular wavelength of light in part 650.

In another embodiment, the whole module is fixed, and a prismatic element refracts the source light into all used colors of light. Each color of light will, without interference, then go back into an individual collimator thence into a combiner, and then return to the destination fiber. One color of light will enter a beam splitter where a majority of the light will travel on to the destination fiber, but some of the light will be used to tune the prismatic element to adjust for vibrations or expansion of the module. A drop fiber placed in an appropriate slot in the module will intercept a defined color of light and disrupt that color from returning to the destination fiber.

In another embodiment, choosing the wavelength of light selected by the drop is done by actuating one or more dip switches on the module. There is a one-source fiber entering the module, and one destination fiber leaving the module, as well as one-drop fiber. Actuating the dipswitches selects the color of light that will be dropped at that module. The rest of the colors of light will continue on through the destination fiber.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A multiplexer, comprising:
   a prismatic element tunable, under the control of a feedback control signal, to refract light at a wavelength of interest from an input light signal incident thereupon in a desired direction;

at least one first light collecting element coupled to receive one or more first light signals at the wavelength of interest from the prismatic element;

at least one photodiode coupled to receive the one or more first light signals at the wavelength of interest from the at least one light collecting element and configured to convert the one or more first light signals into an electrical signal;

at least one second light collecting element coupled to receive light signals at wavelengths other than the wavelength of interest from the prismatic element and to transmit such light signals along a light path output.

2. The multiplexer of claim 1, wherein:

the prismatic element is a positionable Bragg diffraction grating tuned by changing the position of the prismatic element relative to the light collecting element.

3. The multiplexer of claim 1, wherein:

the prismatic element is a temperature sensitive diffraction filter.

4. The multiplexer of claim 1, wherein:

the feedback loop for controlling the prismatic element comprises;
  at least one light collecting element for gathering side band light from the wavelength of interest,
  at least one photodiode coupled to the light collecting element for changing the photonic signal into an electrical signal,
  at least one differential amplifier coupled to the photodiode for summing with the source tuning voltage, and
  at least one piezoelectric actuator for adjusting the position of the prismatic element based on the feedback loop signal.

5. The multiplexer of claim 1, wherein:

the feedback loop for controlling the temperature sensitive diffraction filter comprises;
  at least one temperature sensor for changing thermal data into electrical data,
  at least one differential amplifier coupled to the temperature sensor for summing the electrical data with a source tuning voltage, and
  at least one heater where the output of the heater is controlled by the feedback loop signal.

6. The multiplexer of claim 1, wherein:

the source tuning voltage is remotely setable.

7. The multiplexer of claim 1, wherein:

the color of light is selected by actuating at least one dip switch.

8. The multiplexer of claim 1, wherein:

the color of light dropped is selected by physically occluding a specific otherwise transparent return path.

9. A method comprising:

monitoring the operation of a prismatic element, transforming the observation of the prismatic element into an electrical signal, amplifying the electrical signal with a differential amplifier, summing the amplified signal with a source tuning signal, and using that summed signal to keep the prismatic element tuned.

10. The method of claim 9 wherein;

the operation of the prismatic element monitored is side lobe radiation.

11. The method of claim 9 wherein;

transferring the observation of the prismatic element to an electrical signal is done by a photodetector.

12. The method of claim 9, wherein;

the operation of the prismatic element monitored is temperature.

13. The method of claim 9 wherein;

transferring the observation of the prismatic element to an electrical signal is done by a temperature sensor.

14. A system, comprising:

a prismatic element tunable, under the control of a feedback control signal, to refract light at a wavelength of interest from an input light signal incident thereupon in a desired direction;

at least one first light collecting element coupled to receive one or more first light signals at the wavelength of interest from the prismatic element;

at least one photodiode coupled to receive the one or more first light signals at the wavelength of interest from the at least one light collecting element and configured to convert the one or more first light signals into an electrical signal;

at least one second light collecting element coupled to receive light signals at wavelengths other than the wavelength of interest from the prismatic element and to transmit such light signals along a light path output;

at least one remote terminal comprising a multiplexer;

at least one optical fiber coupled to transmit light to and receive light from the prismatic element; and at least one central office coupled to the optical fiber to transmit light to and receive light from the at least one remote terminal.

15. The system of claim 14, wherein;

the feedback control loop is an optical electrical servo loop.

16. The system of claim 14, wherein;

the feedback control loop is an thermal electrical serve loop.

* * * * *